United States Patent
Monaco et al.

(10) Patent No.: US 11,220,058 B2
(45) Date of Patent: Jan. 11, 2022

(54) DEVICE AND METHOD FOR TREATING 3D POWDER PRINTING ELEMENTS

(71) Applicants: Luigi Monaco, Aschaffenburg (DE); Harald Eckstein, Goldbach (DE)

(72) Inventors: Luigi Monaco, Aschaffenburg (DE); Harald Eckstein, Goldbach (DE)

(*) Notice: Subject to any disclaimer, the term of this patent is extended or adjusted under 35 U.S.C. 154(b) by 0 days.

(21) Appl. No.: 16/965,618

(22) PCT Filed: Feb. 1, 2019

(86) PCT No.: PCT/DE2019/000023
§ 371 (c)(1),
(2) Date: Jul. 29, 2020

(87) PCT Pub. No.: WO2019/149305
PCT Pub. Date: Aug. 8, 2019

(65) Prior Publication Data
US 2021/0039318 A1    Feb. 11, 2021

(30) Foreign Application Priority Data
Feb. 1, 2018 (DE) .......................... 102018000814.3

(51) Int. Cl.
*B29C 64/35* (2017.01)
*B33Y 40/20* (2020.01)
(Continued)

(52) U.S. Cl.
CPC ................ *B29C 64/35* (2017.08); *B08B 5/02* (2013.01); *B08B 5/04* (2013.01); *B08B 7/0035* (2013.01);
(Continued)

(58) Field of Classification Search
CPC ....... B29C 64/35; B29C 64/153; B33Y 40/20; B08B 5/02; B08B 5/04; B08B 7/0035; B08B 7/028; B08B 7/04
See application file for complete search history.

(56) References Cited

U.S. PATENT DOCUMENTS

| | | | | |
|---|---|---|---|---|
| 2001/0045678 A1* | 11/2001 | Kubo | ...................... | B29C 64/35 |
| | | | | 264/37.29 |
| 2004/0084814 A1* | 5/2004 | Boyd | ...................... | B33Y 40/00 |
| | | | | 264/497 |

(Continued)

FOREIGN PATENT DOCUMENTS

| | | |
|---|---|---|
| DE | 9209279 U1 | 9/1992 |
| DE | 202013009787 U1 | 12/2013 |

(Continued)

*Primary Examiner* — Sharidan Carrillo
(74) *Attorney, Agent, or Firm* — Smartpat PLC

(57) ABSTRACT

A device for treating 3D powder printing elements includes a first chamber with a first partial chamber and a second partial chamber separated by at least one screen grid. Grid meshes allow compressed powder residues to pass through. A rotation means rotates the first chamber about an axis of rotation, in particular with a rotary passage. The screen grid is inclined, in particular perpendicular, to the axis of rotation of the first chamber. A filling region allows filling the 3D powder printing elements into the first partial chamber. Gas medium is supplied in the first chamber, in particular in the first partial chamber. Gas medium suction means extract plastic powder residues from the first chamber, in particular from the second partial chamber. The gas medium suction means are mounted in or parallel to the axis of rotation and/or centered by the rotary means, in particular within the rotary passage.

4 Claims, 10 Drawing Sheets

(51) Int. Cl.
  *B08B 5/02*    (2006.01)
  *B08B 5/04*    (2006.01)
  *B08B 7/00*    (2006.01)
  *B08B 7/02*    (2006.01)
  *B08B 7/04*    (2006.01)
  *B29C 64/153*  (2017.01)

(52) U.S. Cl.
  CPC ............... *B08B 7/028* (2013.01); *B08B 7/04* (2013.01); *B33Y 40/20* (2020.01); *B29C 64/153* (2017.08)

(56) References Cited

U.S. PATENT DOCUMENTS

2015/0266157 A1* 9/2015 Summers ................ B24B 31/16
                                                           451/32
2016/0176008 A1* 6/2016 Maeda ...................... B24C 3/26
                                                           451/32
2018/0009007 A1   1/2018 Craft et al.
2018/0333782 A1  11/2018 Gallagher et al.
2019/0184641 A1* 6/2019 Swier ................... B29C 64/357

FOREIGN PATENT DOCUMENTS

DE   102013207354 A1  10/2014
DE   102017115043 A1   1/2018
EP        3017912 B1   6/2018
WO      2017087927 A1   5/2017

\* cited by examiner

DEVICE AND METHOD FOR TREATING 3D POWDER PRINTING ELEMENTS

TECHNICAL FIELD

The disclosure relates to a device for treating 3D powder printing elements and a method for using a device for treating 3D powder printing elements.

BACKGROUND

It is known to use a 3D laser sintering method to produce 3D laser sintered elements by applying local high energy by means of a laser beam and a layer-by-layer structure by raising or lowering a basin with metal powder, plastic powder or the like. This manufacturing process is known in particular under the term 3D printing.

To remove the finished 3D laser sintered elements, the so-called sinter cake is usually broken open by hand and the remaining powder is disposed of and the parts are elaborately improved with regard to their surface structure, since these often do not meet the requirements of customers directly after laser sintering.

This process of removing the 3D laser sintered elements from the sintered kitchen is complex and inaccurate and consumes a large amount of powder without being able to recycle it almost completely and in an environmentally friendly manner.

SUMMARY

The object of the present disclosure is therefore to provide a simple and safe method for treating 3D powder printing elements which avoids the disadvantages of the prior art.

The object is achieved by a device for treating 3D powder printing elements, in particular 3D laser printing elements and/or 3D powder bed elements, in particular produced using a plastic powder laser sintering method, comprising at least one first chamber, with at least one first partial chamber and a second partial chamber, separated by at least one screen grid insert, the grid meshes being adapted to allow printing powder residues, in particular laser printing powder residues, in particular plastic powder residues, to pass through and/or to retain the 3D powder printing elements from the 3D printing powder process, in particular 3D laser printing processes, in particular plastic powder laser sintering processes rotation means for rotating the first chamber about an axis of rotation, in particular with a rotary passage, the screen grid insert being set inclined, in particular perpendicular, to the axis of rotation of the first chamber, a filling area for filling the 3D powder printing elements into the first partial chamber, a gas medium supply means, in particular air supply means, into the first chamber, in particular into the first partial chamber, a gas medium suction means, adapted also for suctioning plastic powder residues from the first chamber, in particular from the second partial chamber, the gas medium suction means being attached in particular in or parallel to the axis of rotation and/or centered by the means of rotation, in particular within the rotary passage.

The present disclosure for cleaning 3D powder printing elements with powder cake, in particular 3D laser printing elements and/or 3D powder bed elements, in particular produced with a plastic powder laser sintering process, which for example can also contain residual sintering powder, in the form of bulk material, in particular in relation to small and medium-sized items series in plastic powder production, a compact, safe and fast procedure for cleaning the manufactured elements and for reusing the unused, expensive powder by means of a separation process is provided. Furthermore, the manual handling is also not conducive to health, so that an increase in safety and improvement of the working environment is also guaranteed here. The device can be of one or more chambers. In a first chamber, a separation in at least two partial chambers can be produced with a grid insert, the grid mesh being selected in such a way that the powder can pass through and the 3D powder elements to be cleaned are not caught. Furthermore, the screen grid means can partially control the air streams with the aid of differently permeable regions, so that no local accumulations of powder are formed, in particular not at the edge region. A toothing can advantageously be formed there, which avoids powder accumulation. A rotary movement and/or a tilting/rotating movement is advantageously used in the chamber. The axis of rotation can advantageously be set obliquely inclined in the room, with at least one component of the screen grid insert perpendicular to the axis of rotation, so that the filled sinter cake with the powder printing elements, in particular laser printing elements, is moved through the partial chamber. By means of the present device for separating, into which the powder cake can advantageously be poured directly from the change frame, the variable angles and speeds advantageously give the possibility of also emptying cavities, sieving off residual powder, filtering and reusing it by powder processing. Up to 70-90% powder can advantageously be extracted. The suction inside the chamber also prevents unwanted powder leakage from the inlet opening. The separation can thus take place mechanically by rotation and/or by air pressure, possibly with ionized air, for example also with an ultrasound method, or else with a pulsating vacuum and/or pulsating air pressure.

The first chamber is emptied in a simple manner. It is particularly advantageous if the first chamber is arranged, for example, above a possible second chamber and can then be simply tilted into the second chamber for emptying and can be emptied into the lower chamber, in particular an air system is connected, so that the powder dust and any Surface treatment residues are retained and the openings can advantageously be coupled to one another essentially airtight and/or with negative pressure and/or with an outflowing air flow into the chamber due to an air cushion arranged on a door, so that advantageously a powder dust freedom for the Working environment and workforce can be guaranteed, especially when transferring to another chamber.

It is advantageous if a second chamber is provided, with at least a first partial chamber and a second partial chamber, separated by at least one screen grid insert, and a rotating means for rotating the second chamber about an axis of rotation is further provided, the screen grid insert particularly being perpendicular to the axis of rotation of the second chamber is set up, the grid in shape and mesh size being particularly adapted for plastic powder residues of the 3D powder printing elements and/or powder particles and/or for preventing 3D powder printing elements from getting caught in grid meshes, a surface beam treatment means, in particular a glass bead device, for irradiation the 3D powder printing elements with powder particles, in particular glass beads, which are provided on the screen grid insert, furthermore in particular a gas medium supply means, in particular air supply means, also a gas medium suction means is provided, adapted to suction plastic powder residues and/or powder particles from the second chamber, in particular from the second partial chamber.

In the second chamber, in particular arranged below, in particular obliquely below the first chamber, with a vertical local component for the use of a gravity transport component for the powder pressure elements, a screen grid insert for separation in at least two partial chambers is also advantageously used. The introduced 3D powder printing elements, in particular laser printing elements, are cleaned in a surface beam treatment, in particular a glass bead device, which can be used, for example, together with or instead of an air supply in a filling opening. The resulting mixed powder, including any residual powder and blasting means that has still been baked on, is then suctioned off, filtered and reused if it is sufficiently pure or disposed of. When transferring powder pressure elements from the first chamber into the second chamber, it is possible to work with lateral guide plates, advantageously the suction then starts up and the chamber is closed while the suction is ongoing before the surface radiation begins.

It is advantageous if a tilting means is provided for tilting and/or turning the first chamber forwards and backwards about a first tilting axis, the tilting axis being set up, in particular, essentially perpendicular to the axis of rotation, with the front, in particular, for adjusting the chamber and turn back about the tilt axis at an angle of in particular about +/−360°, in particular about +/−180°, about +/−90°, and/or the filling area for filling the 3D powder printing elements into the first partial chamber and/or for emptying the 3D powder pressure elements from the first partial chamber into the second chamber, in particular guided by lateral partial guide plates adjacent to the filling area of the second chamber and/or a second tilting axis for tilting and/or lateral advance—and turning back the second chamber in particular with a tilting means, substantially perpendicular to the axis of rotation, in particular for adjusting the chamber turning back and forth about the tilt axis at an angle of in particular about +/−360°, in particular about +/−180°, about +/−90°, and/or the filling area of the second chamber for filling the 3D powder pressure elements from the first partial chamber of the first chamber are to be rotated correspondingly and/or the gas medium suction means is to be derived in the tilting axis.

It is advantageous if the surface treatment means, in particular a glass bead device, is arranged in an upper region of the second chamber, in particular in addition to the arrangement of the gas medium supply means, in particular air supply means. In addition to the surface treatment means and/or a gas medium supply means, sensors and/or an energy supply and/or a suction device can advantageously also be provided.

It is advantageous if the gas medium supply means, in particular air supply means, is to be guided along the tilting axis on the way to the chamber, in particular essentially centrally through the tilting means, in particular by pivoting the tilting means.

It is advantageous if an adjustability of the gas medium supply means, in particular air supply means, and/or the surface beam treatment means, in particular a glass bead device, is provided, in particular a nozzle means which is adjustable with respect to a nozzle angle, in particular synchronized with the tilting movement, is provided.

It is advantageous if a gas medium supply means is provided for supplying an ionized radiation means.

It is advantageous if an ultrasound processing means is arranged in the first chamber and/or second chamber and/or a further chamber. It is advantageous if the first chamber is arranged above the second chamber, in particular perpendicularly or obliquely to one another, so that the elements can be easily transported further by the influence of gravity.

It is advantageous if one or more further chambers are provided after the second chamber and/or one or more further chambers are provided in front of the first chamber for the previous and/or further transfer of the 3D powder printing elements.

It is advantageous if the filling area of the first chamber and/or the filling area of the second chamber is provided in a side area of the first chamber or a side area of the second chamber, in particular in a window shape with a door means, in particular by means of a door moving means In particular, a linear drive, in particular pneumatic, is to be adjusted, in particular provided with an air cushion device, wherein an air cushion actuation and/or door means actuation is to be activated in particular only when filling areas of two chambers meet. The door means is closed during the rotational movement because it is pneumatically operated.

It is advantageous if a gas medium supply is set up essentially parallel to the axis of rotation, the gas medium supply being set up in particular through the filling area.

It is advantageous if the first chamber and/or second chamber are held in the region of the tilting axes on a bogie, which is connected in particular to a holding frame, and can be moved at a height and/or at an axis inclination, in particular the tilting axes of the chambers, and/or is adjustable, in particular on chamber traversing means, in particular adjustable for a setting with the opposite filling areas of the chambers, in particular for the transfer of 3D powder printing elements. It is advantageous if the screen grid insert has an edge region with a tooth-like configuration and/or regions with different medium permeability and/or powder permeability, in particular in regions impermeable to medium and/or powder.

The object is also achieved by a method for using a device according to the disclosure, for treating 3D powder printing elements to be retained, in particular 3D laser printing elements and/or 3D powder bed printing elements, which are produced using a 3D printing method, in particular laser sintering method were, in particular with a plastic powder laser sintering process, comprising at least a first chamber, with at least a first partial chamber and a second partial chamber, which are separated by at least one screen grid insert, the grid meshes being adapted to allow powder residues of powder printing to pass through and/or the 3D powder printing elements to be retained, the 3D powder printing elements from the plastic powder laser sintering process, a rotating means for rotating the first chamber about an axis of rotation, in particular with a rotary passage, the screen grid insert means being inclined, in particular perpendicular to the axis of rotation of the first chamber is set up, and a gas medium supply means, in particular air supply means, is set up in the first chamber, in particular in the first partial chamber, and a gas medium suction means is further set up also for suctioning off plastic powder residues, from the first chamber, in particular from the second partial chamber, the gas medium suction means being in particular in or parallel to the axis of rotation and/or centered by the rotation means, in particular within the rotary passage, and/or a second chamber is set up, with at least a first partial chamber and a second partial chamber, separated by at least one screen grid insert, a rotation means for rotating the second chamber around an axis of rotation is provided, whereas the screen grid insert means is set up in particular perpendicular to the rotation axis of the second chamber, whereas the grid being designed in the form and mesh size in particular to be adapted for plastic powder residues of the 3D powder printing elements and/or radiation particle powder and/or for preventing 3D powder printing elements from getting caught in grid, a surface beam treatment means, in particular a glass bead device, for irradiating the 3D powder printing elements with beam means particle powder, in particular glass beads, which are provided on the screen grid insert means, a gas medium suction means is provided, adapted to suction plastic powder residues and/or powder particles from the second chamber, in particular from the second partial chamber, the first chamber being rotated after filling with 3D powder printing elements and suction and is emptied by the filling area of the first chamber into the filling area of the second chamber, in particular guided through lateral guide plates, whereas a gas medium suction means of the second chamber, is adapted to suction plastic powder residues and/or powder particles, from the second chamber, in particular from the second partial chamber, then starts, whereas the second chamber being closed, in particular while the suction is running, and then using the surface beam treatment means (20), in particular a glass bead device, to be carried out a surface treatment of the filled 3D powder printing elements.

It is advantageous if the gas medium supply means (10, 22) is adapted with regard to the gas medium guidance, in particular a pulsation, in particular changes in air pressure, and/or an adaptation of the beam supply of the gas medium supply means, in particular a nozzle means being adjusted with respect to a nozzle angle, in particular synchronized with the tilting movement, where in particular in a lower low point is to be radiated.

It is advantageous if added powder particle is sucked out of the second chamber by blowing off gas medium and/or a chamber pressure is kept below an external pressure, so that no particles or powder residue can get into the ambient air.

It is advantageous if the one or more further chambers are provided after the second chamber and/or one or more further chambers are provided in front of the first chamber for the further transfer of the 3D powder printing elements, in particular for the execution of further process steps, example, advantageous coatings of the elements and/or infiltration and/or radiation and/or ultrasound.

Further features and advantages of the invention result from the claims and the description below, in which exemplary embodiments of the object of the invention are explained in more detail in conjunction with the drawings.

DETAILED DESCRIPTION

Figure 1:
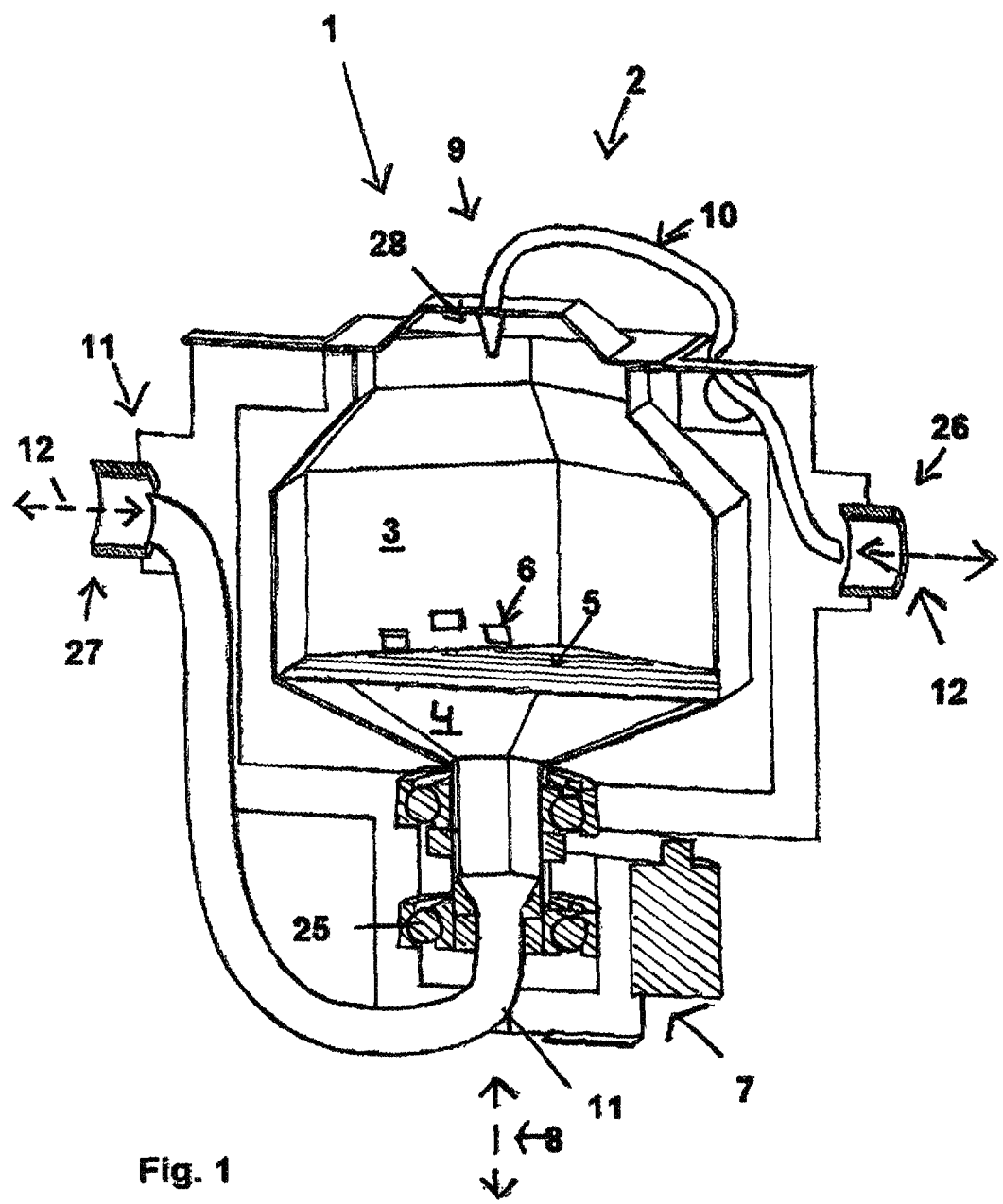
FIG. 1 shows a device for treatment according to the disclosure in a sectional view.

FIG. 1 shows a device 1 for treating 3D powder printing elements 6, in particular 3D laser printing elements, in particular produced using a plastic powder laser sintering method, comprising at least one first chamber 2, with at least one first partial chamber 3 and a second partial chamber 4, separated by at least one grid insert means 5, the grid meshes being adapted to allow printing powder residues to pass through and/or to hold back the 3D powder printing elements 6, in particular plastic powder residues, the 3D powder printing elements 6 from the 3D powder printing method 6, in particular plastic powder laser sintering methods, a rotating means 7 for rotating of the first chamber 2 about a rotation axis 8, in particular with a rotary passage 25, the screen grid insert 5 being set up in particular perpendicular to the rotation axis 8 of the first chamber 2, a filling area 9 for filling the 3D powder printing elements 6 into the first partial chamber 3, a gas medium supply means 10, in particular air supply means, in the first chamber 2, in particular in the first partial chamber 3, a gas medium suction means 11, also adapted to suction plastic powder residues, from the first chamber 2, in particular from the second partial chamber 4, wherein the gas medium suction means 11 is to be attached in particular in or parallel to the axis of rotation 8 and/or centered by the rotation means 7, in particular within the rotary passage 25, with a tilting means 26 for tilting and/or turning the first chamber back and forth 2 is provided about a first tilt axis 12, the tilt axis being set up, in particular, essentially perpendicular to the axis of rotation 8, the back and forth rotation about the tilt axis in particular at an angle of in particular approximately +/−360°, in particular, for adjusting the chamber about +/−180°, in particular about +/−90° can be made by.

A discharge of the gas medium suction means 11 can advantageously also be conducted through a region close to the tilting axis.

A second or further chambers, in particular with a surface treatment means, can also be designed schematically, for example, as shown in FIG. 1, in particular with regard to the feed lines and discharge lines and their advantageous arrangement parallel to the axes of rotation and/or tilting axes of the chambers. In the following figures, the supply lines and discharge lines, in particular for or integrated in gas medium suction medium lines and gas medium supply medium lines, or also a surface beam treatment means, in particular a glass bead device, for irradiating the 3D powder printing elements 6 with radiation means particle powder are not shown separately for reasons of clarity.

Figure 2:
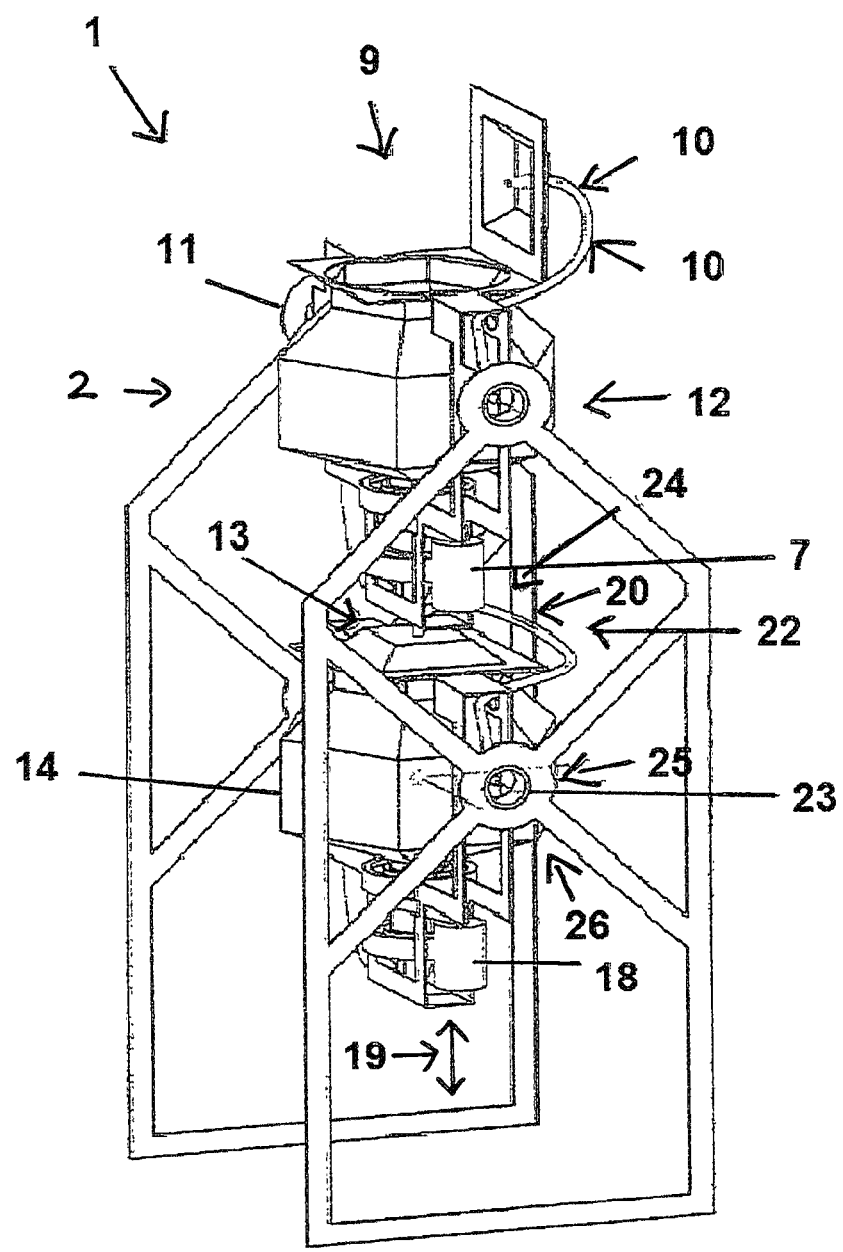
FIG. 2 shows a treatment device according to the disclosure.

FIG. 2 shows a device 1 for treating, with a first chamber 2 and a second chamber 14. Powder cake with 3D powder printing elements 6 can be filled into the opened filling area 9 of the first chamber 2, for example, and the area can then be closed, a gas medium supply means 10 also being attached, for example, to the filling area, with a tilting axis 12 for tilting the first chamber 2 is attached essentially perpendicular to the axis of rotation 8, so that in particular a filling area 13 of the second chamber 14 can also be used for receiving the 3D powder printing elements 6 from the first partial chamber 3 for emptying the 3D powder printing elements 6 from the first partial chamber 3. Furthermore, the second chamber 14 is shown, with at least a first partial chamber 15 and a second partial chamber 16, separated by at least one screen grid insert means 17, as shown for example in FIG. 4, a rotation means 18 for rotating the second chamber 14 about an axis of rotation 19 is also provided, wherein the screen grid insert 17 is set up, in particular, perpendicular to the axis of rotation 19 of the second chamber 14, where the shape and mesh size of the grid is particularly adapted for plastic powder residues of the 3D powder printing elements 6 and/or radiation particle powder and/or to prevent the hooking of 3D powder printing elements 6 in grid mesh, a surface beam treatment means 20, in particular a glass bead device, for irradiating the 3D powder printing elements 6 with radiation particle powder, in particular glass beads, which are provided on the wire mesh insert 17, furthermore in particular a gas medium supply means 22, in particular air supply means, a gas medium suction means 21 is further provided, adapted also designed for suction of plastic powder residues and/or powder particles from the second chamber 14, in particular from the second partial chamber 16, the filling area 13 for filling the 3D powder pressure elements 6 into the first partial chamber 3 and/or for emptying the 3D powder pressure elements 6 from the first partial chamber 3 into the second chamber, in particular guided by lateral partial guide plates adjacent to the filling area 13 of the second chamber and/or a second tilting axis 23 for tilting and/or turning the second chamber 14 sideways back and forth, in particular using a tilting means 26, essentially perpendicular to the axis of rotation 19, wherein in order to adjust the chamber, in particular turning back and forth about the tilting axis at an angle of in particular approximately +/−360°, in particular approximately +/−180°, in particular approximately +/−90°, including a rotational movement, approximately +/−360° can be imaged, and/or the filling area 13 of the second chamber for filling the 3D powder printing elements 6 from the first partial chamber 3 of the first chamber correspondingly is to be rotated.

Figure 3:
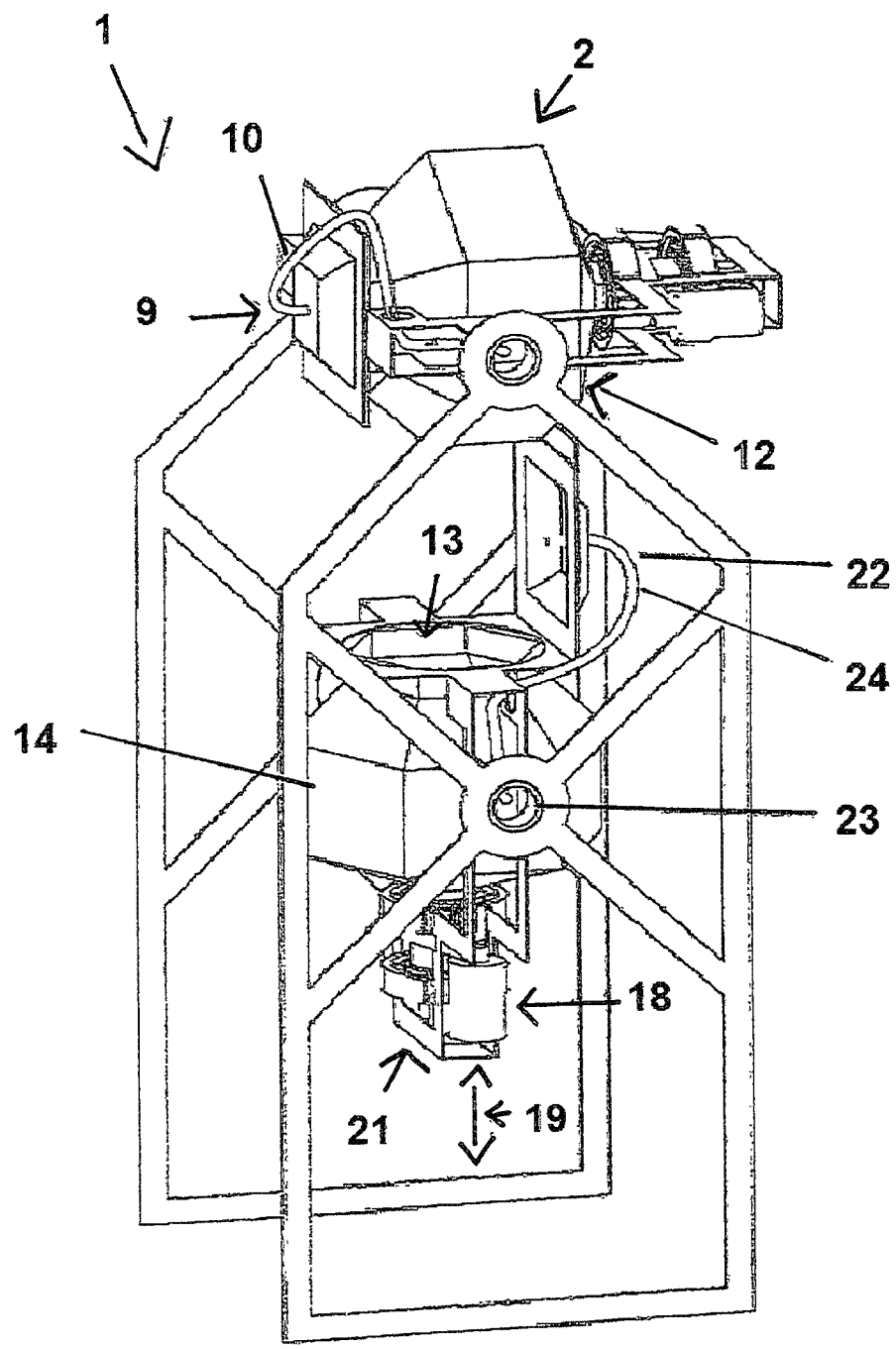
FIG. 3 shows a treatment device according to the disclosure.

FIG. 3 shows a device 1 for treatment, the upper chamber 1 having the tilt axis 12 being tilted into a lateral intermediate layer.

Figure 4:
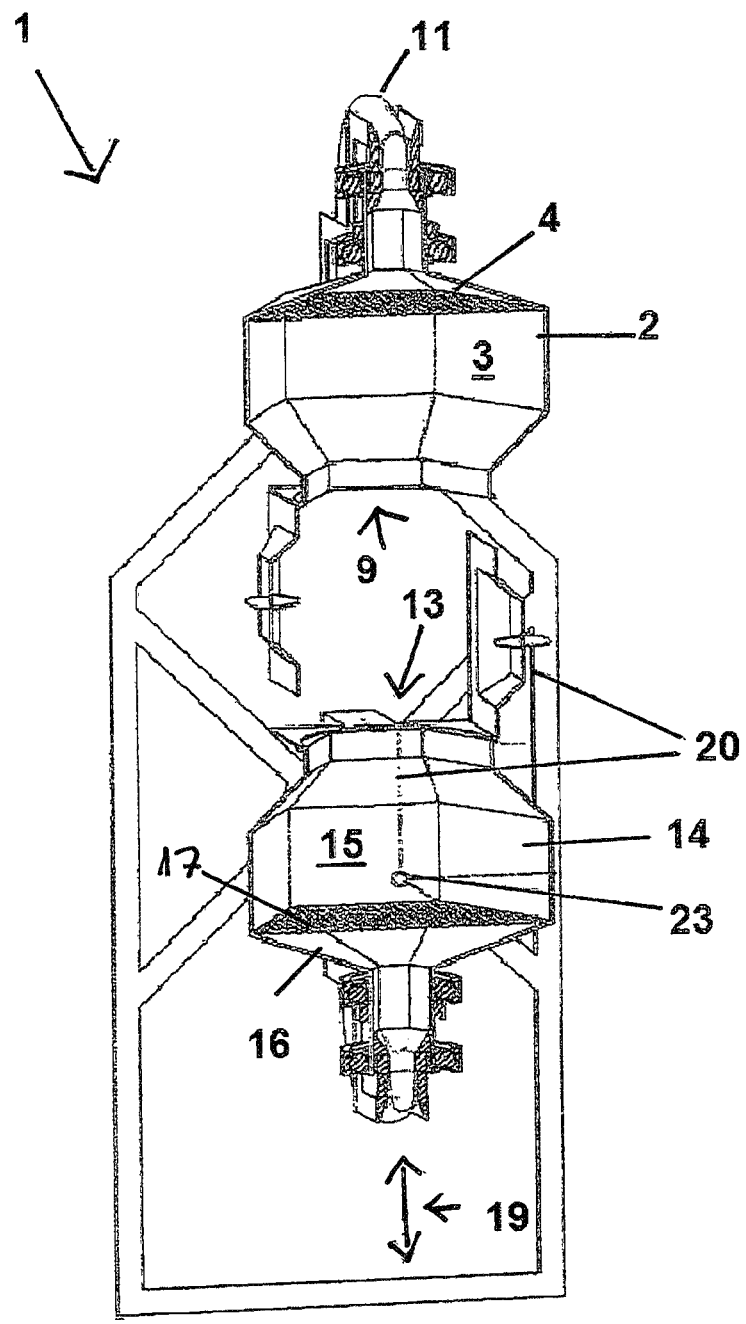
FIG. 4 shows a device according to the disclosure for treatment in a sectional view.

FIG. 4 shows a device 1 for treatment in a sectional view, the filling area 9 having been tilted down and the powder pressure elements from the first chamber 2 being filled into the second chamber 14 into the filling area 13, the first chamber being filled with 3D powder pressure elements and suction is rotated and emptied through the filling area of the first chamber into the filling area of the second chamber, in particular guided through lateral part guide plates, not shown, wherein a gas medium suction means of the second chamber is also adapted for suctioning plastic powder residues and/or powder particles, from the second chamber, in particular from the second partial chamber, as shown in FIG. 2, then runs, the second chamber being closed, in particular while the suction is running, and then with the surface treatment means, in particular a glass bead device e surface treatment of the filled 3D powder printing elements is carried out, wherein advantageously an adjustability of the gas medium supply means 10, in particular air supply means, is provided, in particular a nozzle means 28 which is adjustable with respect to a nozzle angle, in particular synchronized with the tilting movement, is provided.

Figure 5:
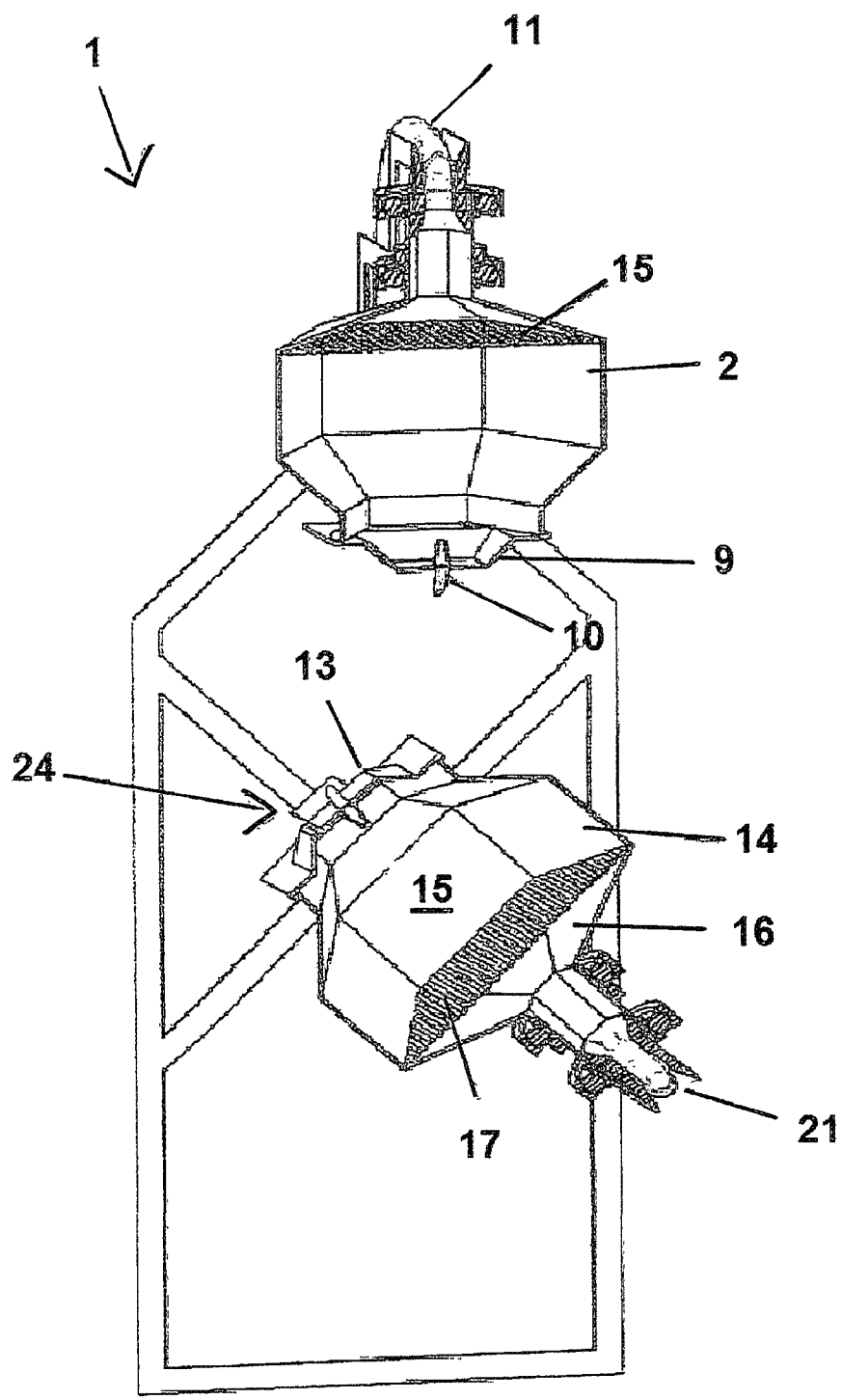
FIG. 5 shows a device according to the disclosure for treatment in a sectional view.

FIG. 5 shows a device 1 for treatment in a sectional view, the second chamber 14 being tilted into an intermediate layer.

Figure 6:
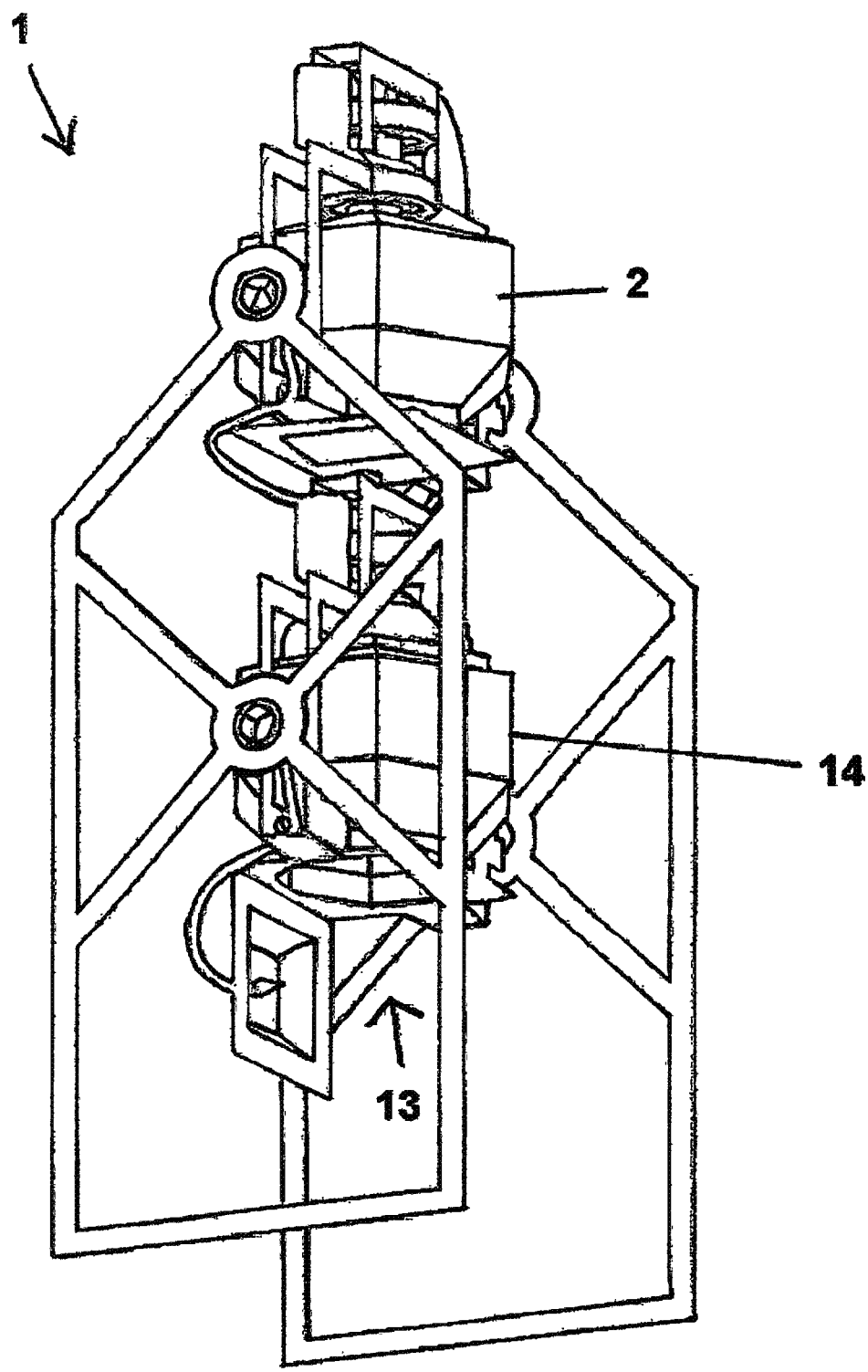
FIG. 6 shows a treatment device according to the disclosure.
Figure 7:
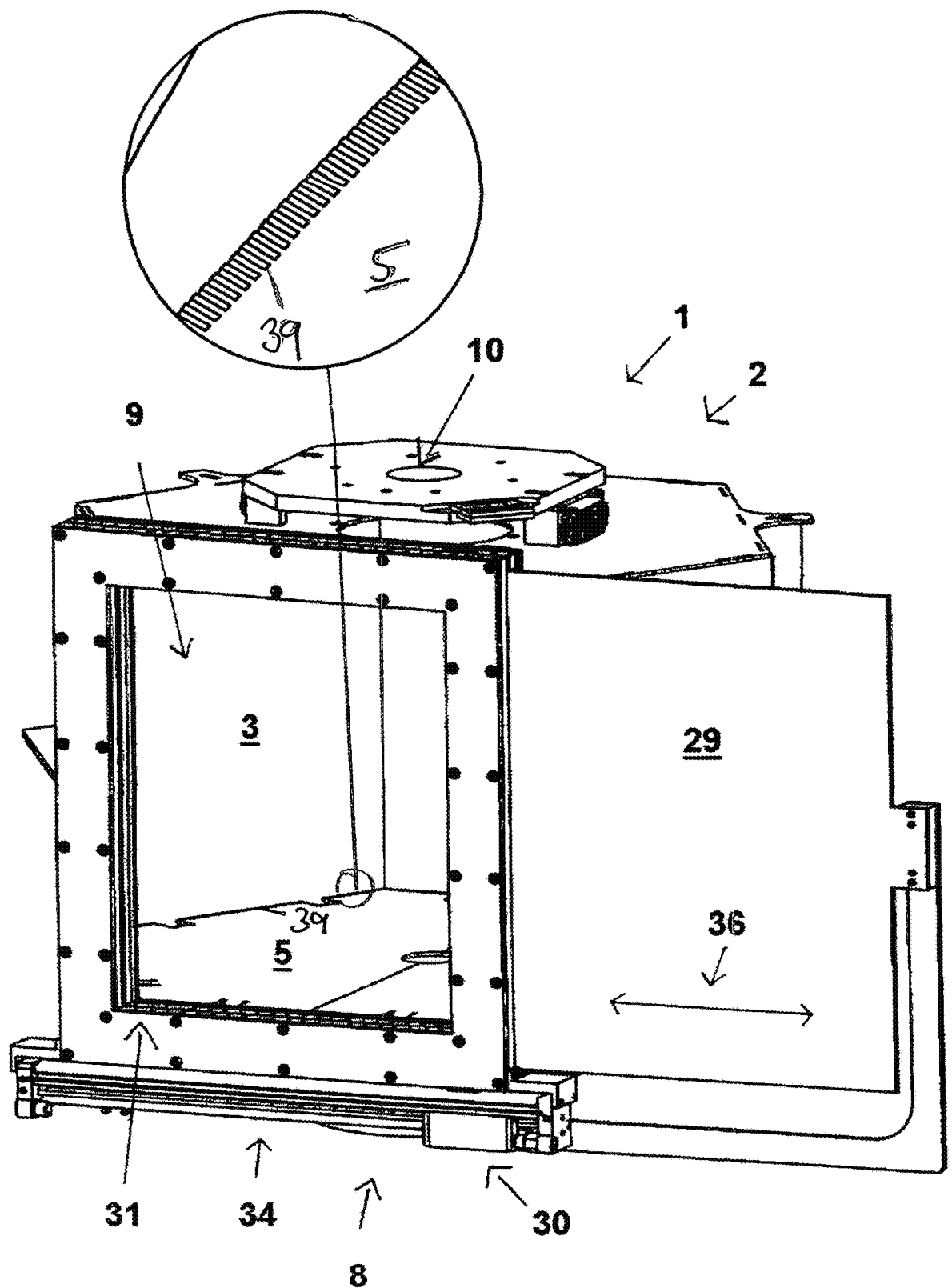
FIG. 7 shows a treatment device according to the disclosure.

FIG. 6 shows a device 1 for treatment, the second chamber 14 being emptied. 7 shows a device 1 for treatment. The device 1 comprises, in particular, a chamber 2, 14, in particular a plurality of chambers and axle bearings, as well as displacement devices for the chambers, which are attached to a holding frame (not shown for reasons of clarity). The holding frame, not shown, is advantageously also present in the devices in FIGS. 8 to 10. The chamber 2 shown as an example has a filling area 9 for the powder pressure elements, not shown, which is also an emptying area for the powder pressure elements. A filling area 9, which also functions as an emptying area for the pressure powder elements with powder cake, is shown by way of example in a side area 34 of the first chamber 2 and/or a side area 35 of the second chamber 14 in FIG. 8, in particular in a window shape with a door means 29, which is to be adjusted in particular by means of a door travel means 30, in particular by means of a slide, for example by means of a linear drive, in particular provided with an air cushion device 31, for guiding and for easier transport when the door means 29 is moved in and out, and in particular cleaning the door surfaces and powder leakage to protect operators and the environment.

Figure 10:
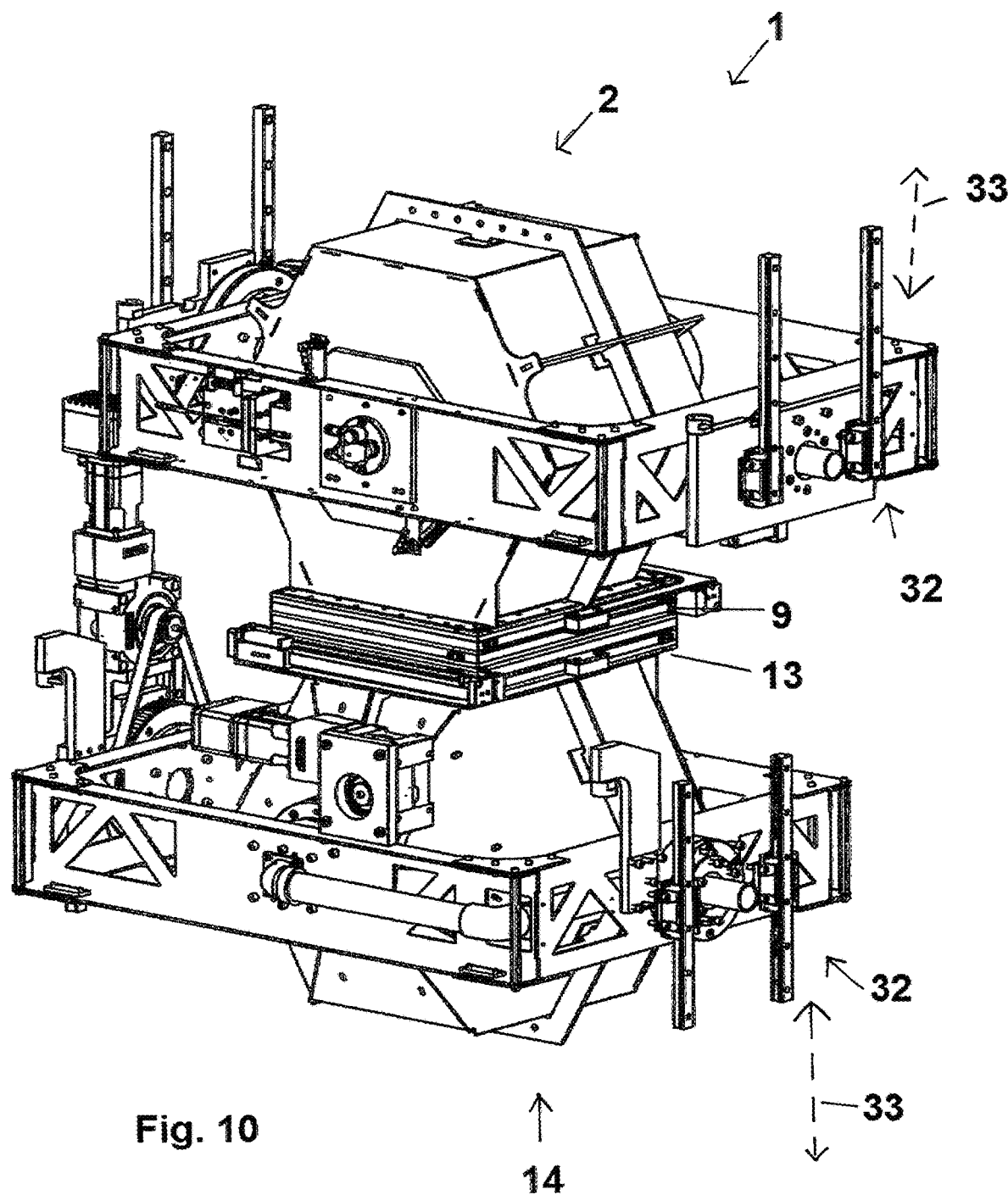
FIG. 10 shows a treatment device according to the disclosure.

The air cushion actuation advantageously takes place only when the door travel means 30 is opened and closed, and the door means 29 is securely closed during the rotational movement of the chamber, since these are actuated only when there is contact, in particular when there is a transfer between the door means of different chambers, as exemplified in FIG. 10 shown. In these states, sensors for, for example, energy supply and/or the air supply to the air cushion are also docked.

The screen grid insert 5 can—as shown—also only partially, in particular at the edge, be designed as a permeable screening device, in particular with the aid of adapted edge designs in the form of, for example, tooth-like configurations 39 or additional inserts with different medium passage thicknesses.

Figure 8:
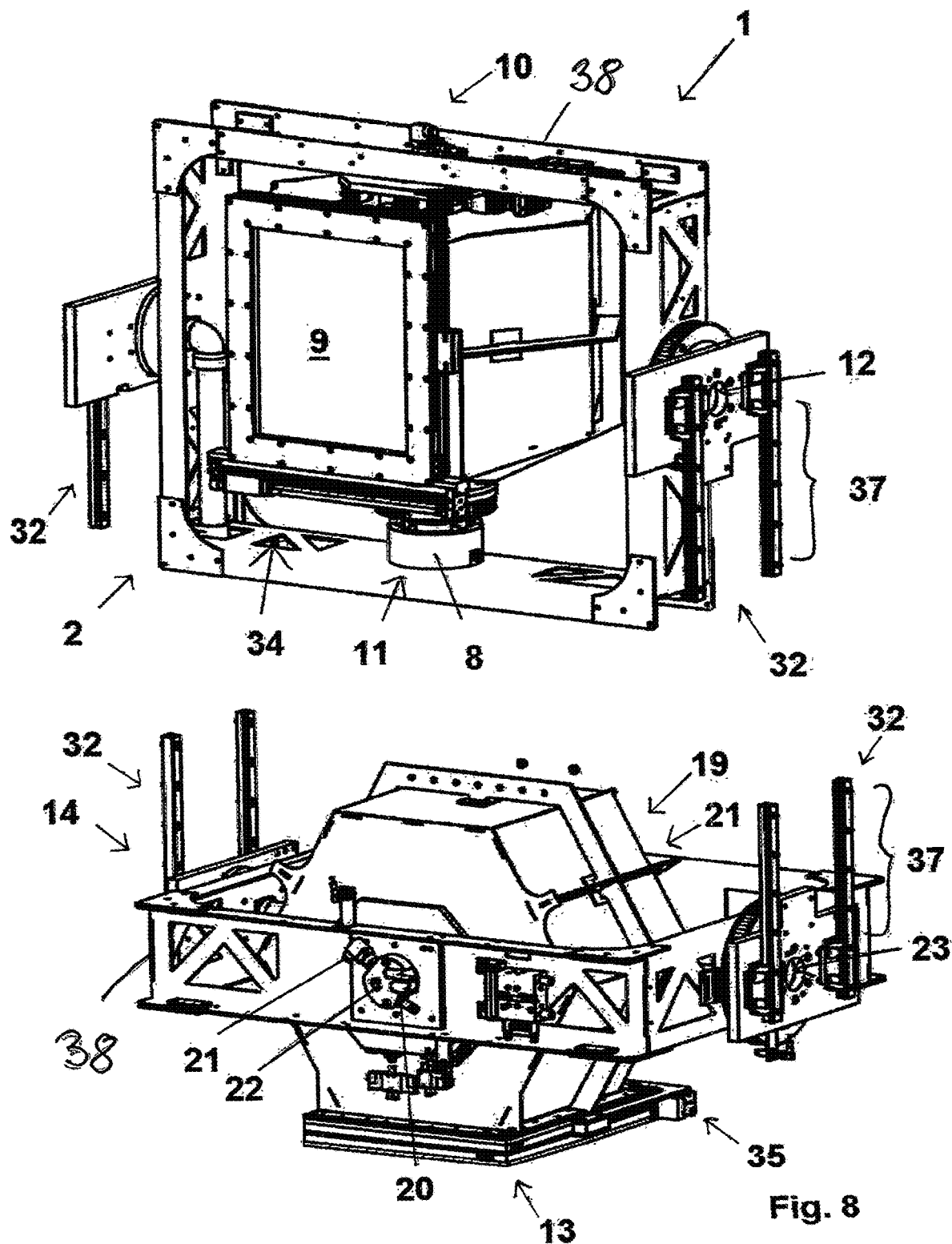
FIG. 8 shows a treatment device according to the disclosure.

FIG. 8 shows a device 1 for treatment, attached to a holding frame (not shown), for example as in FIG. 1, the first and/or second chamber 2, 14 in the region of the tilting axes 12, 23 on a rotating frame 38, 9, are held and can be moved at an exemplary height 37 and/or an optional transverse displacement means, not shown, in particular on chamber moving means 32, in particular in a direction of travel 33, particularly advantageously when setting with opposite filling areas 9, 13, as shown in FIG. 10. Gas medium supply means 22 and the supply of surface treatment means 20 are introduced together into chamber 14 by way of example. After the surface treatment of the powder pressure elements 6, the gas medium is then suctioned off, for example. The powder pressure elements can advantageously be transported through different chambers in the sense of a movement by gravity, in particular with at least one vertical movement component, that is to say, for example, chambers can be arranged at a 45° angle relative to one another.

Figure 9:
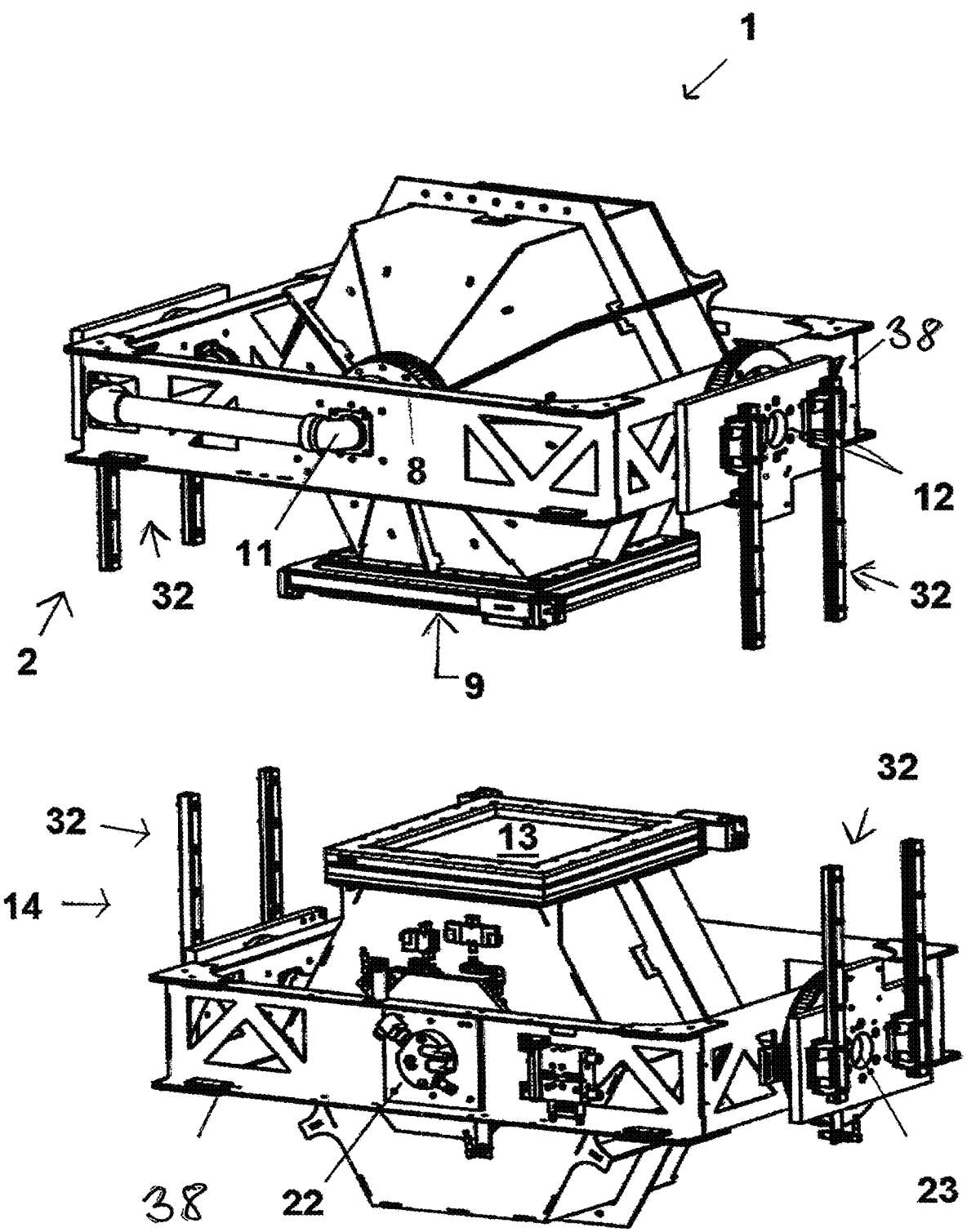
FIG. 9 shows a treatment device according to the disclosure.

FIG. 9 shows a device 1 for treatment, with a medium supply along a tilt axis and a discharge along the opposite tilt axis.

FIG. 10 shows a device for treatment with filling regions 9, 13 moved together opposite one another, wherein a sensor system can be provided for registering the docking process and, in particular, coupling and suction of air can be carried out in order to make the opening more secure and to prevent it from escaping particles and/or powder to avoid health hazards.

As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

REFERENCE SIGN LIST 1 device for treating
2 first chamber
3 first partial chamber
4 second partial chamber
5 screen grid insert means
6 3D powder printing elements
7 rotation means
8 axis of rotation
9 filling area
10 gas medium supply means
11 gas medium suction means
12 tilt axis
13 filling area
14 second chamber
15 first partial chamber
16 second partial chamber
17 screen grid insert means
18 rotation means
19 axis of rotation
20 surface beam treatment means
21 gas medium suction means
22 gas medium supply means
23 tilt axis
24 upper area
25 rotary passage
26 tilting means
27 offtake
28 nozzle means
29 door means
30 door moving means
31 air cushion means
32 chamber moving means
33 direction of travel
34 side area
35 side area
36 moving in and out
37 height
38 bogie
39 tooth-like configuration

The invention claimed is:

1. A method for treating 3D powder printing elements, comprising:
 providing a device (1) for treating 3D powder printing elements, comprising
 a first chamber (2) with
  a first partial chamber (3),
  a second partial chamber (4), and
  a first screen grid insert (5) having grid meshes separating the first partial chamber (3) and the second partial chamber (4), the grid meshes being adapted to allow printing powder residues to pass through and to retain the 3D powder printing elements (6);
 a rotation means (7) for rotating the first chamber (2) about an axis of rotation (8), the first screen grid insert (5) being inclined to the axis of rotation (8) of the first chamber (2);
 a filling area (9) for filling the 3D powder printing elements (6) into the first partial chamber (3);
 a gas medium supply (10) for supplying a gas medium into the first chamber (2) and
 a gas medium suction (11), adapted also for suctioning printing powder residues from the first chamber (2), and
 a second chamber (14) with
  a first partial second chamber (15) and
  a second partial second chamber (16) separated by a second screen grid insert (17), and
 a second rotation means (18) for rotating the second chamber (14) around a second axis of rotation (19), and
 a surface beam treatment means (20);
 filling the first chamber with 3D powder printing elements;
 applying suction to the first chamber;
 rotating the first chamber;
 emptying the first chamber, through the filling area (9) into a filling area (14) of the second chamber;
 closing the second chamber; and
 treating the 3D powder printing elements in the second chamber with the surface beam treatment means (20).

2. The method according to claim 1, wherein the gas medium supply (10) comprises a nozzle (28) and wherein the method further comprises adjusting an angle of the nozzle (28).

3. The method according to claim 1, further comprising providing one or more further chambers subsequent to the second chamber or
 providing one or more further chambers in front of the first chamber for further transfer and/or treatment of the 3D powder printing elements.

4. The method according to claim 2, further comprising:
 sucking printing powder residues out of the second chamber (14).

* * * * *